United States Patent Office 3,557,194
Patented Jan. 19, 1971

3,557,194
HYDROXYDITHIOAROMATIC ACIDS, DERIVATIVES THEREOF AND PROCESS FOR THEIR MANUFACTURE
Charles H. Fuchsman, Cleveland Heights, and William H. Meek, Northfield, Ohio, assignors to Ferro Corporation, Cleveland, Ohio
No Drawing. Filed Apr. 4, 1969, Ser. No. 813,772
Int. Cl. C07c *153/03, 153/07*
U.S. Cl. 260—502.6                             18 Claims

ABSTRACT OF THE DISCLOSURE

Process for preparing hydroxydithioaromatic compounds of the formula:

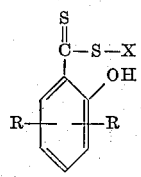

wherein X is H, a metallic cation or an alcoholic residue, and the R groups are relatively inert substituents; which comprises reacting a phenoxide of the formula:

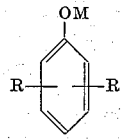

wherein M is a metallic cation and R is as previously defined and wherein at least one position ortho to the OM group is unsubstituted; and carbon disulfide in the presence of a dimethylamide solvent of the formula:

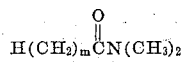

wherein $m$ is an integer from 0 to 3; under substantially anhydrous conditions for a time and temperature sufficient to dithiocarboxylate said phenoxide, and recovering the resultant salt or acidifying or esterifying the salt; and novel compounds of the formula:

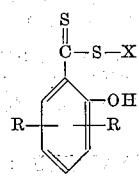

wherein X and R are as previously defined provided that all R groups are not H, hydroxy, alkoxy, or mixtures. The novel compounds are useful as bactericides and fungicides.

---

This invention relates to a process for preparing hydroxydithioaromatic compounds of the formula:

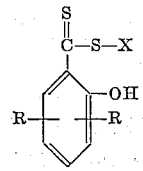

wherein X is H, a metallic cation, or an alcoholic residue; and the R groups are realtively inert substituents, which can be the same or different and which can be joined to each other through a heteroatom to form a heterocyclic ring, or can be rejoined to the ring through a heteroatom to form a fused heterocyclic ring. This invention also relates to novel compositions of matter of the above formula wherein R and X are as previously defined, provided that the R groups are not all hydrogen, hydroxy, alkoxy or mixtures.

More particularly the process of this invention for preparing compounds of the formula:

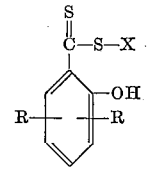

comprises reacting a phenoxide of the formula:

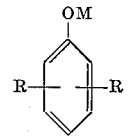

wherein M is a metallic cation and R is a relatively inert substituent and wherein at least one position ortho to the OM groups is unsubstituted; and carbon disulfide in the presence of a dimethylamide solvent of the formula:

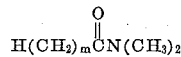

wherein $m$ is an integer of from 0 to 3; under substantially anhydrous conditions for a time and temperature sufficient to dithiocarboxylate said phenoxide and recovering the resultant salt or esterifying or acidifying the salt. The term "relatively inert substituent" is intended to include any substituent whose composition is substantially unaltered and which is not removed from the ring during the dithiocarboxylation reaction. In the above formulae, examples of suitable relatively inert substituents represented by R include alkyl, cycloalkyl, alkoxy, halogen, hydrogen, dialkylamino and alkylthio. The R groups can, with the scope of the general formula, be joined through a heteroatom to form a fused heterocyclic ring (e.g., a compound having an isoquinoline structure); or one R group can be rejoined to the benzene ring through a heteroatom to form a fuzed heterocyclic ring compound of the quinoline, benzothiophene, or benzofuran types. Exemplary of suitable heteroatoms are S, N and O. Suitable alkyl groups whether attached directly to the benzene ring, or through sulfur or nitrogen (as in alkylthio, or dialkylamino groups) include methyl, ethyl, propyl, isopropyl, butyl, isobutyl, tert.-butyl, n-amyl, isoamyl, tert.-amyl, hexyl, heptyl, tert.-octyl, sec.-nonyl, and other straight and branched chain alkyl groups containing up to 18 carbon atoms. Representative cycloalkyl groups are those from 5 to 7 carbon atoms such as cyclopentyl, cyclohexyl and methylcyclohexyl. Representative halogens include fluorine, chlorine, and bromine. Representative metallic cations are sodium, potassium and lithium. Sodium and potassium are normally preferred because of their low cost and ready availability.

By alcoholic residue is meant the molecular portion X in the compound XOH wherein XOH is an alcohol. In such cases X can be an alkyl or cycloalkyl group as previously defined, or it can be an aralkyl group of from 7 to 14 carbon atoms (such as benzyl) or an alkoxyalkyl group of from 3 to 8 carbon atoms (such as methoxyethyl) or an alkylthioalkyl of from 3 to 8 carbon atoms (such as ethylthioethyl) or a dialkylaminoalkyl of from 2 to 8 carbon atoms (such as dipropylaminoethyl). XOH can also be used to represent one binding site of a di- or polypol of from 2 to 15 carbon atoms (e.g. pentaerythritol). The complete compound of this invention in such a case would be the di-, tri- or tetraester.

Suitable dimethylamide solvents include dimethylformamide, dimethylacetamide and dimethylpropionamide, of which the first is usually preferred because of its efficacy, availability and low cost. In some cases however superior yields can be obtained by the use of dimethylacetamide or one of the other amides.

If desired the amide solvent can be combined with another relatively inert solvent, e.g., a high-boiling hydrocarbon like lubricating oil, but at least one mole of the dimethylamide should be present per mole of metal phenoxide if the formation of the metal salt of the dithio acid is to proceed expeditiously.

The reaction is conducted under substantially anhydrous conditions in order to minimize the hydrolysis of the alkali metal phenoxide, although some product will be formed in most cases when a minor amount of water (e.g., about 0.2%) is present in the reaction mixture.

The reaction can be conveniently conducted at a temperature between about 140° C. and about 175° C. and at atmospheric pressure. Preferably the reaction is conducted at a temperature between about 155° C. and about 170° C. The reaction will generally be complete in a period between about 0.5 and about 2.0 hours and the product can be recovered as the salt; acidified to form the free acid; or the product can be esterified by reaction with a dialkyl sulfate, a benzene sulfonate ester of the desired alcohol or the compound X-halogen, wherein the X is the alcohol residue and the alkyl and halogen are as previously defined.

In order to prepare the phenoxide, the appropriate phenol can be treated with an alkali metal alkoxide or alkali metal hydroxide in a solvent from which the water or alcohol can be removed by distillation. Exemplary of suitable alkali metal hydroxides are: potassium hydroxide and sodium hydroxide. Exemplary of suitable solvents are aromatics, such as benzene, toluene, xylene, and ethylbenzene; and aliphatics, such as hexane, cyclohexane, mineral spirits, gasoline, etc. The mixture can then be heated to reflux temperature and the water or alcohol of reaction collected in a trap. The dialkyl amide can then be added and the solvent removed by distilling at a temperature of between about 115 and 170° C. depending upon the particular amide and solvent selected. After allowing the mixture to cool to between about 60° C. and about 100° C., the carbon disulfide can be slowly added while the mixture is continuously agitated in order to control the exothermic reaction. When the addition of carbon disulfide is complete, the reaction mixture can be heated to a temperature between about 140 and 175° C., and preferably between about 150° C. and about 170° C. for a time sufficient to effect reaction. Generally a period of from about 1 to about 2 hours will be sufficient. After allowing the mixture to cool to room temperature, the alkali metal salt can be dissolved in water and then washed with a water-immiscible solvent such as toluene. The alkali metal salt can be recovered from the aqueous layer by evaporation. If desired, the alkali metal salt can be converted directly to the free acid by treating the aqueous layer with a strong acid such as hydrochloric acid. The free dithio acid can then be recovered by filtration. It can be purified by recrystallization. If desired, the metal salt of the dithio acid can be esterified in situ by reaction with a dialkyl sulphate, a benzene sulfonate ester, or alkyl halide.

EXAMPLE 1

Preparation of 3,5-ditert.-butyldithiosalicylic acid and potassium salt

In a 1 liter three necked flask fitted with a stirrer, thermometer, and condenser fitted with a Dean Stark trap, was added a mixture of 41.2 grams of 2,4-ditert.-butylphenol (0.2 mole), 150 ml. of toluene and 12.5 grams of potassium hydroxide (90% flake, 0.2 mole). The mixture was heated at reflux temperature until all of the water of reaction was collected in the Dean Stark trap. To the mixture was then added 10 ml of dimethylformamide and the mixture was heated to a temperature of 140° C. to distill off the toluene. The mixture was allowed to cool to 90° C. and 15.2 grams of carbon disulfide was added drop-wise by means of a dropping funnel over a period of 15 minutes in order to control the exothermic reaction. The mixture was then heated allowing the solvent to distill to a temperature of 160° C. and maintained at that temperature for one hour before allowing to cool to 90° C. Then the potassium 3,5 - ditert.-butyldithiosalicylate reaction product was dissolved in 600 ml. of water. The aqueous solution was extracted twice with 100 ml. portions of toluene and the solution of potassium 3,5-ditert.-butyldithiosalicylate acidified with concentrated hydrochloric acid. The resultant 3,5-ditert.-butyldithiosalicylic acid product was recovered as a red oil.

EXAMPLE 2

Preparation of 3-tert.-butyl-5-methyldithiosalicylic acid and methyl ester

Employing the equipment of Example 1, 82 grams of 2-tert.-butyl-para-cresol was dissolved in 300 ml of dimethylacetamide and to this mixture was added 27.0 grams sodium methylate (sodium methoxide) (0.5 mole). The mixture was heated to a temperature of 160° C., then allowed to cool to 90° C., 38 grams of carbon disulfide (0.5 mole) was slowly added, the addition requiring 15 minutes. The mixture was heated to a temperature of 180° C. and maintained at that temperature for two hours. The mixture was cooled and dissolved in 600 ml of water and washed twice with 100 ml of toluene. The volume of aqueous solution was 700 ml. A 100 ml. portion was acidified with concentrated hydrochloric acid, and the precipitate washed and dried to recover 7.0 grams of 3-tert.-butyl-5-methyldithiosalicylic acid. Based on the total volume the quantity of total product would be 49 grams (40% yield). 10.0 grams of 3-tert.-butyl-5-methyldithiosalicylic acid (0.042 mole) was dissolved in a solution of 4.5 grams sodium carbonate in 100 ml. water (0.042 mole). While agitating, 5.3 grams of dimethyl sulfate was added and the mixture agitated for 30 minutes at 25° C. The resultant precipitate was filtered, washed with water and dried to recover 7.0 grams of methyl 3-tert.-butyl - 5 - methyldithiosalicylate (66.2% yield). M.P., 95–7° C.

EXAMPLE 3

Preparation of 5-octyldithiosalicylic acid and potassium salt

When an aqueous solution of potassium 5-octyldithiosalicylate prepared according to the procedure of Example 1 was acidified, 5-octyldithiosalicylic acid was recovered. The product is a red oil.

EXAMPLE 4

Preparation of 3-tert.-butyl-5-chloridithiosalicylic acid

In accordance with the general procedure of Example 1, 36.9 grams of 2-tert.-butyl-4-chlorophenol (0.2 mole), 12.5 grams of potassium hydroxide (90% flake 0.2 mole), 150 ml. of toluene, 100 ml. of dimethylformamide, and 15.2 grams of carbon disulfide (0.2 mole) were employed, and the reaction conducted at a temperature of 160° C. for one hour. The potassium 3-tert.-butyl-5-chlorodithiosalicylate was recovered in aqueous solution and acidified to produce 3-tert.-butyl-5-chlorodithiosalicylic acid. The product, a dark red solid had a melting point of 135° C.

EXAMPLE 5

Preparation of 5-(methylthio)dithiosalicylic acid and its potassium salt.

In accordance with the general procedure of Example 1, 28.0 grams of para-(methylthio)phenol (0.2 mole), 15.2 grams of carbon disulfide (0.2 mole), 12.5 grams of potassium hydroxide (flake 90%, 0.2 mole), 100 ml. toluene, and 50 mil. of dimethylformamide were employed and the reaction conducted at a temperature of 160° C. for two hours. After water extraction the resulting potassium 5-(methylthio)dithiosalicylate solution was acidified with concentrated hydrochloric acid and 5-(methylthio)dithiosalicylic acid recovered as an oil. The product decomposes on standing. It can be stored as the sodium salt by dissolving it in aqueous sodium carbonate.

EXAMPLE 6

Preparation of 5-chlorodithiosalicylic acid and its potassium salt

In accordance with the general procedure of Example 1, 25.6 grams of parachlorophenol (0.2 mole), 15.2 grams of carbon disulfide (0.2 mole), 12.5 grams of potassium hydroxide (flake 90%, 0.2 mole), 100 ml. of toluene, and 50 ml. of dimethylformamide were employed and the reaction conducted at a temperature of 160° C. for two hours. After water extraction the potassium 5-chlorodithiosalicylate solution was acidified with concentrated hydrochloric acid to recover 5-chlorodithiosalicylic acid. The solid product decomposed on standing but its esters are stable.

EXAMPLE 7

Preparation of 4-N,N-diethylaminodithiosalicylic acid and potassium salt

In accordance with the general procedure of Example 1, 35.9 grams metadiethylaminophenol (92%, 0.2 mole), 12.5 grams of potassium hydroxide (flake 90%, 0.2 mole), 15.2 grams of carbon disulfide, 100 ml. of toluene, and 100 ml. of dimethylformamide were employed and the reaction conducted at a temperature of 160–165° C. for a period of two hours. After water extraction the potassium 4-N,N-diethylaminodithiosalicylate solution was recovered and acidified with concentrated hydrochloric acid to yield 4-N,N-diethylaminodithiosalicylic acid. M.P., 70–1° C.

EXAMPLE 8

Preparation of 8-hydroxyquinoline-7-dithiocarboxylic acid, and potassium salt

In accordance with the general procedure of Example 1, 30.5 grams of 8-hydroxyquinoline (95%, 0.2 mole), 12.5 grams of potassium hydroxide (flake 90%, 0.2 mole), 125 ml. of toluene, 75 ml. of dimethylformamide, and 15.2 grams of carbon disulfide were employed and the reaction conducted at a temperature of 160–165° C. over a period of two hours. After extraction, an aqueous solution of the potassium salt of 8-hydroxyquinoline-7-dithiocarboxylic acid was produced and acidified with concentrated hydrochloric acid to produce 8-hydroxyquinoline-7-dithiocarboxylic acid as a solid.

EXAMPLE 9

Preparation of methyl 5-chlorodithiosalicylate

In accordance with the procedure of Example 1, potassium 5-chlorodithiosalicylate was prepared and treated with dimethyl sulfate according to the procedure of Example 2, in a molar ration of 1:1 at a temperature of 40° C. for a period of one hour. The resulting methyl 5-chlorodithiosalicylate was recrystallized from methanol as a solid. M.P., 54.5° C. Analysis: 28.93% S (theory 29.25% S).

EXAMPLE 10

Preparation of methyl 5-methylthio-4-methyldithiosalicylate

In accordance with the general procedureof Example 1, 30.8 grams 4-methylthio-meta-cresol, 12.5 grams potassium hydroxide (flake 90%), 15.2 grams of carbon disulfide, 100 ml. of toluene and 100 ml. of dimethylformamide were employed and reaction conducted at a temperature of 160° C. for one hour. The aqueous extract was treated with dimethyl sulfate in the manner described in Example 2 and the methyl 5-methylthio-4-methyldithiosalicylate product recovered. M.P., 97–102° C. Analysis: 39.49% S (theory 39.30% S).

EXAMPLE 11

Preparation of 3-tert.-butyl-5-methyldithiosalicylic acid

In accordance with the general procedure of Example 1, 32.8 grams of 2-tert.-butyl-para-cresol (0.2 mole), 12.5 grams of potassium hydroxide (flake 90%, 0.2 mole), 150 ml. toluene, 100 ml. of dimethylformamide, and 15.2 grams carbon disulfide were employed and the reaction conducted at a temperature of 160° C. for one hour. Following aqueous extraction and acidification, 38.1 grams of 3-tert.-butyl-5-methyldithiosalicylic acid was recovered (79.4% yield); M.P., 125.5–126° C.

EXAMPLE 12

Attempted preparation of 3-tert.-butyl-5-methyldithiosalicylic acid in water

In accordance with the general procedure of Example 1, 32.8 grams of 2-tert.-butyl-para-cresol (0.2 mole), 12.5 grams of potassium hydroxide (90%, 0.2 mole), 15.2 grams carbon disulfide (0.2 mole) and 100 ml. of water were employed and the reaction conducted at a temperature of 95° C. for the three hours. No reaction was observed and upon acidification no acid was noted.

EXAMPLE 13

Attempted preparation of 3-tert.-butyl-5-methyldithiosalicylic acid in nitrobenzene In accordance with the general procedure of Example 1, 18.8 grams of 2-tert.-butyl-para-cresol (0.1 mole), 7.6 grams of carbon disulfide (0.1 mole), 6.2 grams of potassium hydroxide (90% flake, 0.1 mole), 75 ml. toluene and 75 ml. of nitrobenzene were employed and the reaction conducted at a temperature of 150–160° C. for a period of two hours. After water extraction and acidification with concentrated hydrochloric acid, no product was obtained.

EXAMPLE 14

Preparation of 5-methyldithiosalicylic acid

In accordance with the general procedure of Example 1, 21.6 grams of para-cresol (0.2 mole), 12.5 grams potassium hydroxide (flake 90%, 0.2 mole), 150 ml. of toluene, 100 ml. of dimethylformamide and 15.2 grams of carbon disulfide were employed and the reaction conducted at a temperature of 160° for one hour. Following aqueous extraction and acidification, 5-methyldithiosalicylic acid was recovered as a solid. M.P., 5–10° C.

EXAMPLE 15

Preparation of benzyl 3-tert.-butyl-5-methyldithiosalicylate

To 300 ml. of the aqueous solution of Example 11 was added 19.0 grams benzyl chloride (0.15 mole). The mixture was heated at reflux temperature for six hours whereupon the mixture separated into an oil layer and a nearly colorless water layer. The oil layer contained the product benzyl 3-tert.-butyl-5-methyldithiosalicylate.

EXAMPLE 16

Preparation of sodium 3-tert.-butyl-5-methyldithiosalicylate 300 ml. of the aqueous solution prepared in Example 11 was dissolved in dilute sodium carbonate and evaporated to ¼ of its volume and allowed to cool to room temperature. The product sodium 3-tert.-butyl-5-methyl-dithiosalicylate product crystallized, was filtered and dried.

The novel compounds prepared by the process of the invention have several uses. For example, compounds suitable as corrosion inhibitors in oils may be prepared by forming the esters of dithioaromatic acids and subsequently treating them with sulfur chlorides. (U.S. Pat. 2,390,342).

In the case of the novel compounds which have alkyl substitution on the aromatic ring they may be used in rubber and oils since the alkyl groups increase solubility and dispersibility in polymeric hydrocarbons (such as rubber, polyolefins and hydrocarbon lubricants). In addition the novel salts of the invention are useful as intermediates to prepare the corresponding acids and esters. The latter compounds are useful as bactericides and fungicides.

In order to test for their effect on bacteria and fungi the free acids or esters are incorporated in nutrient agar or Sabouraud agar to various dilutions. Stock dilutions of 1% are prepared in isopropyl alcohol.

The bacterial cultures are streaked over the surface of the agar. The bacterial plates are incubated at 37° C. for 48 hours and then observed for the presence of growth or no growth. A mixed fungi culture is also streaked over the surface of the agar and the fungus plates incubated at 27° C. for 7–14 days. The plates are then observed for evidence of growth. The compound 3-tert.-butyl-5-methyl-dithiosalicylic acid completely inhibited the growth of *Staphylococcus aureus* at 0.02% and inhibited the growth of *Escherichia coli, Pseudomonas aeruginosa* and of mixed fungi culture at 0.1%. (The species of fungi in the mixed culture were *Aspergillus niger, Penicillium citrinum* and *Streptomyces rubrireticuli*.)

The other acids and esters of this invention described in the foregoing examples are also effective in inhibiting the growth of the above micro organisms, the minimum inhibitory concentration being dependent upon the precise structure of the compound and the particular choice of test organism.

By comparison with the dimethyl amide solvents employed in the process of the invention, dimethyl sulfoxide, another aprotic solvent, was found to be totally inoperative in producing dithiosalicylic acids when the reaction was conducted at low temperature. Similar reactions to produce para-hydroxy dithio benzoic acids, however, are in fact successful when conducted at room temperature. Examples of phenols which cannot be dithiocarboxylated at room temperature in dimethyl sulfoxide are:

2,4-ditert.-butylphenol
m-diethylaminophenol
p-cresol
2-tert.-butyl-4-chlorophenol
4-(methylthio)-phenol
4-(methylthio)-m-cresol
4-chlorophenol
6-tert.-butyl-m-cresol
2-tert.-butyl-p-cresol When conducted at elevated temperature the reactions in dimethyl sulfoxide are complicated by partial decomposition of the solvent which renders the recovery of the dithiocarboxylated product more difficult, and in some cases impossible. In the cases of phenols in which both ortho and para sites are available for dithiocarboxylation, it has been found that room temperature reaction in dimethyl sulfoxide will give para substitution while high temperature reaction in amide solvents gives ortho substitution. For example, alpha-naphthol when dithiocarboxylated in dimethyl sulfoxide at room temperature gives 1-hydroxy naphthalene-4-dithiocarboxylic acid. The same reactants in dimethyl formamide at elevated temperature gives 1-hydroxynaphthalene-2-dithiocarboxylic acid.

What is claimed is:
1. A process for preparing hydroxydithioaromatic compounds of the formula:

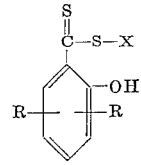

wherein X is a metallic cation, and the R groups are relatively inert substituents; which comprises reacting a phenoxide of the formula:

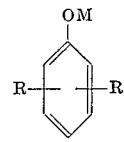

wherein M is a metallic cation and R is as previously defined and wherein at least one position ortho to the OM group is unsubstituted; and carbon disulfide in the presence of a dimethylamide solvent of the formula:

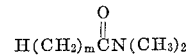

wherein $m$ is an integer from 0 to 3; under substantially anhydrous conditions for a time and temperature sufficient to dithiocarboxylate said phenoxide; said R groups being selected from the class consisting of hydrogen, halogen, cycloalkyl of 5 to 7 carbon atoms, alkyl, alkoxy, dialkylamino, alkylthio, and divalent groups in which the two R groups are joined through sulfur, nitrogen or oxygen to form a fused heterocyclic ring of the quinoline, isoquinoline, benzothiophene and benzofurane type, the hydrocarbon portions of said alkyl, alkoxy, dialkylamino, alkylthio and divalent groups having no more than 18 carbon atoms.

2. The process of claim 1 wherein the product is acidified to form hydroxydithioaromatic compounds of said formula wherein R is as previously defined and X is H.

3. The process of claim 1 wherein the phenoxide is dithiocarboxylated at a temperature between about 140° C. and about 175° C.

4. The process of claim 1 wherein the amide is dimethylformamide.

5. The process of claim 1 wherein the amide is dimethylacetamide.

6. Compounds of the formula:

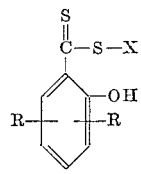

wherein X is H or a metallic cation, and each R is selected from the class consisting of hydrogen, halogen, cycloalkyl or 5 to 7 carbon atoms, alkyl, alkoxy, dialkylamino, alkylthio, and divalent groups in which the two R groups are joined through sulfur, nitrogen or oxygen to form a fused heterocyclic ring of the quinoline, isoquinoline, benzothiophene and benzofurane type, the hydrocarbon portions of said alkyl, alkoxy, dialkylamino, alkylthio and divalent groups having no more than 18 carbon atoms, said R groups representing no more than one hydrogen or alkoxy, and at least one of said R groups representing one of said groups other than hydrogen.

7. A compound of claim 6 wherein X is H and the groups represented by R are alkyl.

8. A compound of claim 6 wherein X is a metallic cation and the groups represented by R are alkyl.

9. A compound of claim 6 namely 3,5-ditert.-butyl-dithiosalicylic acid.

10. A compound of claim 6 namely potassium 3,5-ditert.-butyldithiosalicylate.

11. A compound of claim 6 namely 5-octyldithiosalicylic acid.

12. A compound of claim 6 namely 3-tert.-butyl-5-chlorodithiosalicylic acid.

13. A compound of claim 6 namely 5-(methylthio)-dithiosalicylic acid.

14. A compound of claim 6 namely 5-chlorodithiosalicylic acid.

15. A compound of claim 6 namely 4-N,N-diethylaminodithiosalicylic acid.

16. A compound of claim 6 namely 5-methyldithiosalicylic acid.

17. A compound of claim 6 namely 3-tert.-butyl-5-methyldithiosalicylic acid.

18. A compound of claim 6 namely sodium 3-tert.-butyl-5-methyldithiosalicylate.

References Cited

UNITED STATES PATENTS

| 2,289,649 | 7/1942 | Hardman | 260—502.6 |
| 3,136,800 | 6/1964 | Grisley | 260—502.6 |
| 3,410,894 | 11/1968 | Wolff | 260—502.6 |

DANIEL D. HORWITZ, Primary Examiner

U.S. Cl. X.R.

260—283; 330.5, 346.2, 455; 424—301, 315